United States Patent
Artel et al.

(10) Patent No.: US 9,566,624 B2
(45) Date of Patent: Feb. 14, 2017

(54) SUPPORT ROLLER

(71) Applicant: SMS group GMBH, Düsseldorf (DE)

(72) Inventors: Jens Artel, Kirchhundem (DE);
Michael Breuer, Hilchenbach (DE);
Matthias Kipping, Herdorf (DE); Olaf Norman Jepsen, Siegen (DE); Olaf Hausmann, Duisburg (DE)

(73) Assignee: SMS GROUP GMBH, Düsseldorf (DE)

( * ) Notice: Subject to any disclaimer, the term of this patent is extended or adjusted under 35 U.S.C. 154(b) by 141 days.

(21) Appl. No.: 14/397,068

(22) PCT Filed: Apr. 22, 2013

(86) PCT No.: PCT/EP2013/058301
§ 371 (c)(1),
(2) Date: Oct. 24, 2014

(87) PCT Pub. No.: WO2013/160254
PCT Pub. Date: Oct. 31, 2013

(65) Prior Publication Data
US 2015/0151341 A1 Jun. 4, 2015

(30) Foreign Application Priority Data
Apr. 26, 2012 (DE) .................. 10 2012 206 905

(51) Int. Cl.
*B21B 39/00* (2006.01)
*B21B 27/02* (2006.01)
(Continued)

(52) U.S. Cl.
CPC ............ *B21B 39/008* (2013.01); *B21B 13/14* (2013.01); *B21B 27/02* (2013.01); *B21B 2267/08* (2013.01);
(Continued)

(58) Field of Classification Search
CPC .......... B21B 13/14; B21B 27/02; B21B 27/03;
B21B 27/08; B21B 27/083; B21B 27/086;
B21B 31/07; B21B 31/076; B21B 39/008;
B21B 2203/18; B21B 2267/02; B21B
2267/08; B21B 2269/00; B21B 2269/02;
B21B 2269/04; B21B 2269/06; B21B
2269/08; Y10T 29/49549; F16C 13/022;
F16C 19/04; F16C 19/06; F16C
19/08; F16C 39/00; F16C 39/02; F16C
39/04; F16C 41/005; F16C 2322/12; F16C
23/10
(Continued)

(56) References Cited

U.S. PATENT DOCUMENTS 4,218,905 A 8/1980 Lehmann et al.
5,800,324 A * 9/1998 Schiel ................ F16C 13/028
492/16
7,448,484 B2 11/2008 Brinkmeier et al.

FOREIGN PATENT DOCUMENTS

DE 2651028 A1 5/1978
DE 10128999 A1 12/2002
(Continued)

OTHER PUBLICATIONS

Notification of Reasons for Refusal in English for related Japanese Application JP 2015-507489 that describes JP S63-119926U.*
(Continued)

*Primary Examiner* — A. Dexter Tugbang
*Assistant Examiner* — Joshua D Anderson
(74) *Attorney, Agent, or Firm* — Lucas & Mercanti, LLP; Klaus P. Stoffel

(57) ABSTRACT

A support roller, particularly for rolling mill systems or equipment for casting, conveying or straightening metal products, including a cylindrical roller axle, a hollow cylindrical outer ring arranged concentrically in relation to the
(Continued)

roller axle, and a plurality of rolling bodies arranged between the roller axle and the outer ring. The roller axle further including a cavity, at least in certain sections between its central axis and a load introduction point. Due to the provision of the cavity the load rating and the service life of the support roller are increased.

20 Claims, 3 Drawing Sheets

(51) Int. Cl.
*B21B 13/14* (2006.01)
*F16C 19/04* (2006.01)
(52) U.S. Cl.
CPC ............ *F16C 19/04* (2013.01); *F16C 2322/12* (2013.01); *Y10T 29/49549* (2015.01)

(58) Field of Classification Search
USPC .. 72/31.07, 31.08, 31.09, 163, 252.2; 492/1, 2, 7, 46; 384/255, 447
See application file for complete search history.

(56) References Cited

FOREIGN PATENT DOCUMENTS

| DE | 102005048971 | 4/2007 |
|---|---|---|
| JP | S5357164 A1 | 5/1978 |
| JP | S63119925 U | 8/1988 |
| JP | 2004530049 A1 | 9/2004 |

OTHER PUBLICATIONS

Human Translation of JP63-119926 provided to USPTO by FLS, Inc. May 2016.*

* cited by examiner

SUPPORT ROLLER

The present application is a 371 of International application PCT/EP2013/058301, filed Apr. 22, 2013, which claims priority of DE 10 2012 206 903.4, filed Apr. 26, 2012, the priority of these applications is hereby claimed and these applications are incorporated herein by reference.

BACKGROUND OF THE INVENTION

Prior Art

Many types of support rolls are known in the area indicated above and are frequently arranged in two or three rows, wherein a roll axle is supported in stationary fashion in a bearing block, and an outer ring, rotatably supported by rolling elements, is provided around the roll axle.

DE 26 51 028 describes a rolling stand with support rolls, which comprise hydrostatic support elements.

A roller table roll is known from DE 101 28 999 A1 especially for the transport of furnace-hot metal strip material, cast strands of steel, and the like.

A known arrangement of this type is shown schematically in FIG. 1. The arrangement shown comprises a support roll 1, supported in a bearing block 9; the support roll comprises the roll axle 2 with a center axis "a", several rolling elements 5, and an appropriately dimensioned outer ring 3, which can come into contact with a metal product or a roll. The load, i.e., the introduction of the load, via the metal product or the roll into the rolling elements is represented by the line of force "F". This force can be the result of, for example, a straightening procedure in a straightening machine, or it can simply be the result of the intrinsic weight of the metal product. The position of the load introduction area or load introduction point is usually not limited to the vertical, position indicated. Loads can also act on a support roll, i.e., on its circumference, at other angles.

The disadvantage of the arrangement shown is that the rolling elements are subject to a very large load precisely at the apex. In particular, at certain times the maximum load is exerted on only a single rolling element of the row located at the apex.

This results in a highly irregular load-bearing behavior of the rolling elements of a rolling element row. As a result of the linear load introduced into the outer ring, the rolling element in the apex position bears up to about 50% of the load absorbed by the row in question.

As a result, the (dynamic) load rating and the service life of the support roll are reduced.

Especially in straightening machines, irregular forces occur along the roll axle; these forces subject certain individual rolling elements to very heavy loads, which can be much greater in particular than the loads exerted on the rolling elements adjacent in the longitudinal direction to these individual elements.

SUMMARY OF THE INVENTION

In view of this prior are, the technical goal is to provide a support roll in which the (dynamic) load rating and/or the service life is increased or optimized.

In addition, preferably at least one of the above-mentioned disadvantages is to be overcome.

To achieve the technical goal, the present invention comprises a support roll, especially for rolling mill systems or equipment for casting, conveying, or straightening metal products, with a cylindrical roll axle, a hollow-cylindrical outer ring (rotatably) arranged concentrically to the roll axle, and a plurality of rolling elements (or rows of rolling elements) arranged between the roll axle and the outer ring. According to the invention, the roll axle (at least in certain sections) comprises a cavity arranged eccentrically to its (geometric) center axis, which cavity can be arranged essentially between the center axis of the roll axle and a point of load introduction (into the circumference of the support roll or of the outer ring).

By means of the arrangement according to the invention, the roll axle acquires an elasticity, which makes it possible for the rolling elements under load in the apex position to avoid some of the load. In particular, the load acting on a rolling element is distributed more effectively over the adjacent rolling elements, i.e., adjacent both in the longitudinal direction of the roll axle and also in its circumferential direction. The service life and the dynamic load rating of the support roll are increased, and the wear of the roller bearings is reduced. In particular, a linear load acting on the outer ring is now more effectively distributed over the various rolling elements of a rolling element row.

In general, the rolling elements are preferably arranged in several rolling element rows lying next to each other in the direction of the center axis of the roll axle. The roll axle constitutes a cylindrical body with a circular cross section.

There is no longer any need to provide a plurality of higher-grade or more highly wear-resistant rolling elements. Simply by providing a cavity in the roll axle, the load distribution and durability are greatly improved. On the other hand, it is also possible to use very high-grade and highly wear-resistant rolling elements in order to maximize the durability.

The term "metal product" is used to denote in particular metal strips, plates, sections, or other metal parts.

According to a preferred embodiment of the support roll, the cavity extends over at least 80% of the length of the roll axle. The cavity can in particular also extend over the entire length of the roll axle.

According to another preferred embodiment of the support roll, the cavity is configured as a bore, which extends essentially parallel to the center axis of the roll axle. If a bore is provided, is possible to achieve a considerable improvement in the durability of the support roll in only a single work step (namely, the boring process).

According to another preferred embodiment of the support roll, the center axis of the bore is located essentially in a plane passing through the load introduction point and the center axis of the roll axle. It is precisely in this area that the load on the roller bearings is the greatest.

According to another preferred embodiment of the support roll, the bore comprises a diameter which is between 50% and 95%, and preferably between 75% and 90%, of the radius of the roll axle.

According to another preferred embodiment of the support roll, the wall thickness of the roll axle remaining above the bore (i.e., next o the bore in the direction toward the load introduction point) is at least 5%, and preferably at least 10%, of the radius of the roll axle.

According to another preferred embodiment of the support roll, the wall thickness of the roll axle remaining above the bore (i.e., next to the bore in the direction toward the load introduction point) is no more than 50%, and preferably no more than 25%, of the radius of the roll axle.

The ranges noted above can represent a good compromise between load-bearing capacity and elasticity.

According to another preferred embodiment of the support roll, the rolling elements are configured as balls or cylinders.

According to another preferred embodiment of the support roll, the outer ring and/or the rolling elements each have a cross-sectional thickness equal to 20-50%, and preferably to 25-40%, of the diameter of the roll axle.

According to another preferred embodiment of the support roll, the roll also comprises an inner ring between the roll axle and the rolling elements to protect the roll axle from mechanical abrasion. The inner ring can preferably have a maximum cross-sectional thickness of less than 20%, and preferably of less than 10%, of the radius of the roll axle.

The present invention also comprises a roll arrangement, especially for rolling mill systems or equipment for the casting, conveying, or straightening of metal products. A roll arrangement of this type comprises, first, a support roll according to the invention and, second, means for supporting the support roll. Such means can comprise at least one bearing block (preferably at least two bearing blocks). In particular, the roll axle can be supported in a basically stationary (nonrotating) manner by the support means or bearing block.

In addition, the invention comprises a straightening, casting, or rolling machine with at least one support roll or roll arrangement according to one of the above embodiments.

Finally, the invention also comprises a method for the production of a support roll comprising the steps of providing a roll axle, introducing an eccentric bore into the roll axle, and assembling the roll axle, the rolling elements, and a hollow-cylindrical outer ring together to form the support roll. The rolling elements (arranged in rows) form a rotatable bearing between the outer ring and the roll axle.

The embodiments described above and their features can be combined with each other or exchanged for one another.

In the following, the figures of the exemplary embodiments will be described briefly. Additional details can be derived from the detailed description of the exemplary embodiments.

DETAILED DESCRIPTION OF THE INVENTION

Figure 1:
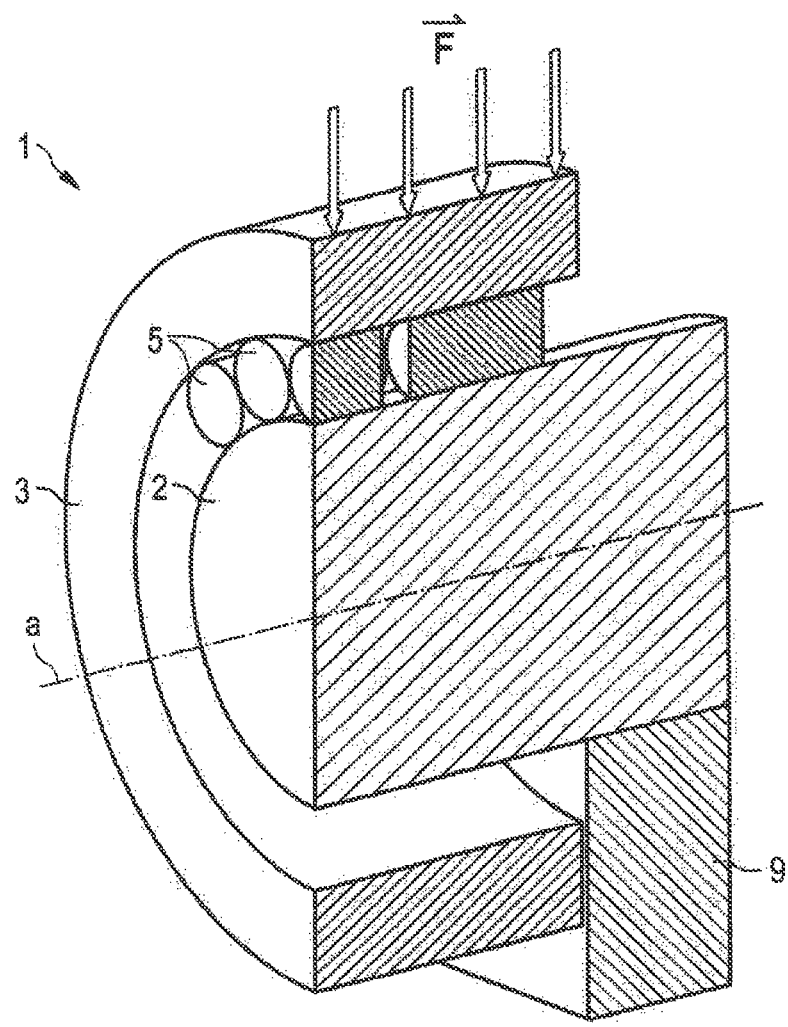
FIG. 1 shows a perspective partial cross section of a support roll according to the prior art.
Figure 2:
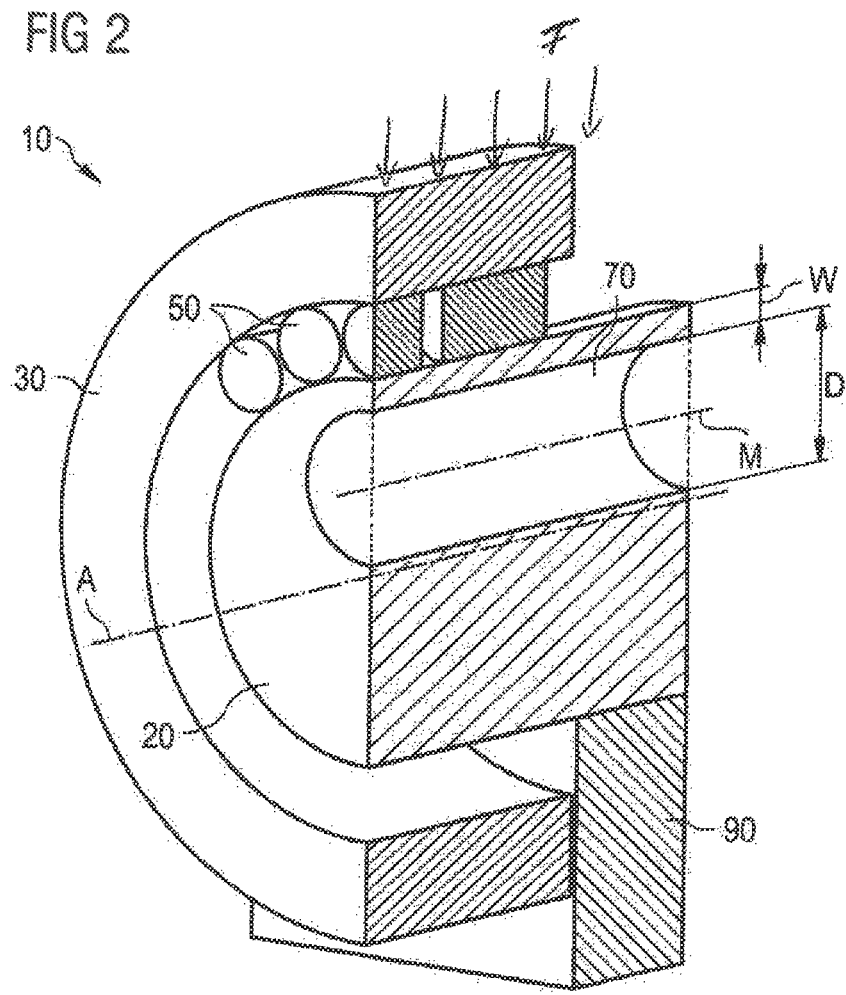
FIG. 2 shows a perspective partial schematic cross-section of a support roll according to an exemplary embodiment according to the invention.

FIG. 1, which reflects the prior art, has already been described above. FIG. 2 shows a support roll 10, supported in a bearing block 90. Like the support roll shown in FIG. 1, the support roll 10 comprises a roll axle 20, an outer ring 30, and rolling elements 50 located between the outer ring 30 and the roll axle 20. The rolling elements are preferably arranged in several (adjacent) rows. The roll axle 20 comprises here a center axis A, above which a cavity 70 is provided. The cavity 70 preferably comprises a round cross section (perpendicular to the center axis of the roll axle). The cross section can also be configured as an oval or polygon, however. Several cavities or parallel bores 70 are also possible. The invention is not limited to cavities or bores 70 which are located above the center axis A. Instead, the cavities or bores 70 are preferably arranged in such a way that they are located essentially between a point where the load is introduced into the roll 10 and the center axis A. A load of this type can be caused by, for example, another roll, another roller, or by a metal product, especially a metal product to be leveled.

As is conventional, the roll axle 20 is preferably supported in stationary fashion in the bearing blocks 90. The roll axles and the other elements of the support roll or support roll arrangement together with the bearing block 90 can be made preferably for the most part of steel or steel alloys.

In general, a load or force F can act on the circumference of the support roll 10 primarily during the operation of the support roll 10. The circumference of the support roll, i.e., the circumference of the outer ring, can also be described as, for example, a cylindrical late surface. Irregular load distributions can occur especially in the area of a straightening machine.

Figure 3:
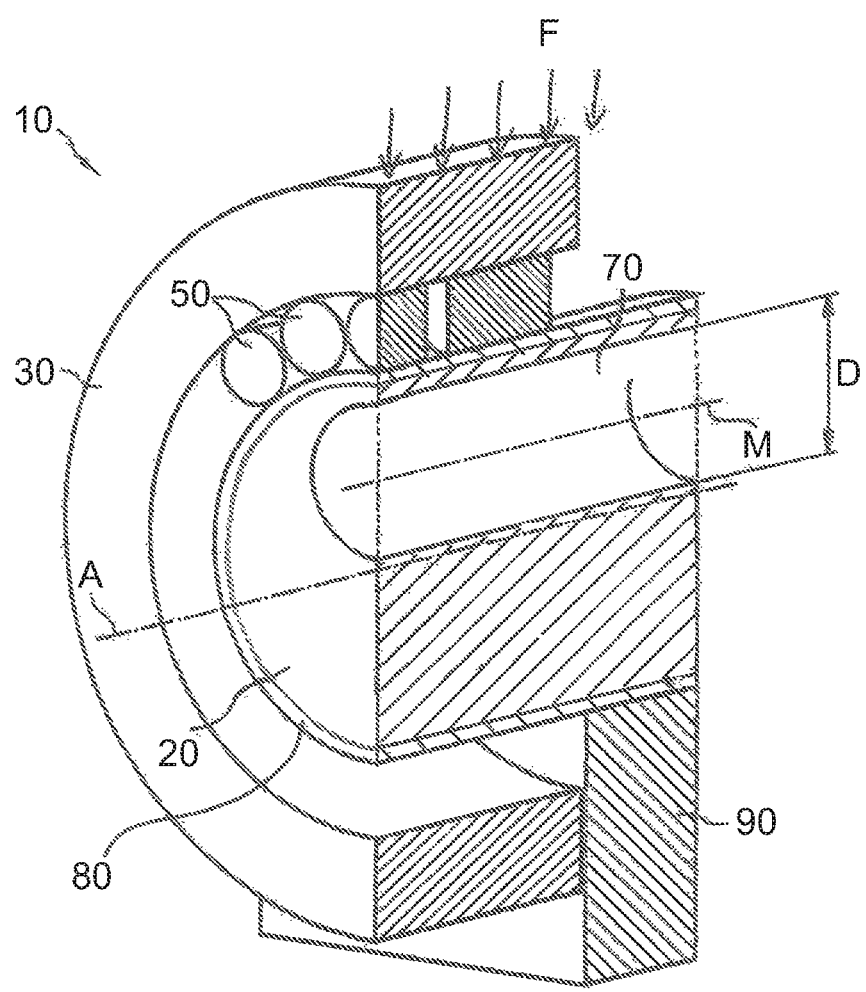
FIG. 3 shows a view as in FIG. 2 with an inner ring.

By the introduction of a bore or cavity 70 into the roll axle 20, a load F of this type can be more effectively distributed by the rolling elements 50 over the roll axle 20 or an additional inner ring 80 between the rolling elements 50 and the roll axle 20 (see FIG. 3).

As a result of the formation of the cavity 70, furthermore, the load acting on a certain rolling element 50 can in general be more effectively absorbed (both in the circumferential direction of the roll and also in the axial direction) by the rolling elements 50 surrounding it.

It is also preferable in general for the profile of the roll axle 20 to vary in the axial direction. This means that, for example, the roll axle 20 can be configured preferably with a larger cross section in the middle area (seen in the axial direction), but optionally it could also be configured with a smaller cross section in the middle than in the areas of the roll axle 20 situated farther outward in the axial direction.

Preferred relative diameters of the outer ring 30, of the rolling elements 50, and of the roll axle 20 have already been given in the section "Disclosure of the Invention".

Finally, the person skilled in the art can adapt individual features of the invention or of its embodiments to suit the existing conditions.

LIST OF THE REFERENCE SYMBOLS 1 support roll
2 roll axle
3 outer ring
5 rolling element
9 bearing block.
10 support roll
20 roll axle
30 outer ring
50 rolling element
70 cavity/bore
90 bearing block
a center axis of the roll axle
A center axis of the roll axle
D diameter of the cavity/of the bore
F force/introduction of load into the circumference of the support roll
M center axis of the bore
W least wall thickness of the roll axle in the direction toward the load introduction point

The invention claimed is:

1. A support roll for rolling mill systems or equipment for casting, conveying, or leveling of metal products, comprising:
a substantially cylindrical roll axle;

a hollow cylindrical outer ring arranged concentrically to the roll axle; and a plurality of rolling elements arranged between the roll axle and the outer ring, wherein the roll axle, at least in certain sections, comprises a cavity arranged eccentrically to a center axis of the roll axle, the cavity being arranged substantially between the center axis and a point at which load is introduced into a circumference of the support roll, wherein the cavity is configured as a bore that extends substantially parallel to the center axis of the roll axle, wherein a center axis of the bore is located in a plane passing between the load introduction point and the center axis of the roll axle.

2. The support roll according to claim 1, wherein the cavity extends at least over a length of the plurality of rolling elements in a manner parallel to the center axis of the roll axle and/or extends over at least 40% of a length of the roll axle.

3. The support roll according to claim 2, wherein the cavity extends over at least 80% of the length of the roll axle.

4. The support roll according to claim 1, wherein the bore has a diameter which is between 50% and 95% of a radius of the roll axle.

5. The support roll according to claim 4, wherein the bore has a diameter between 75% and 90% of the radius of the roll axle.

6. The support roll according to claim 1, wherein the roll axle has a least wall thickness remaining next to the bore in a direction toward the load introduction point that is at least 5% of a radius of the roll axle.

7. The support roll according to claim 6, wherein the least wall thickness is at least 10% of the radius of the roll axle.

8. The support roll according to claim 1, wherein the roll axle has a least wall thickness remaining next to the bore in a direction toward the load introduction point that is no more than 50% of a radius of the roll axle.

9. The support roll according to claim 8, wherein the least wall thickness is no more than 25% of the radius of the roll axle.

10. The support roll according to claim 1, wherein the rolling elements are configured as ball elements or cylinder elements.

11. The support roll according to claim 1, wherein the outer ring and/or the rolling elements each have a cross sectional thickness of between 20% and 50% of a diameter of the roll axle.

12. The support roll according to claim 11, wherein the outer ring and/or the rolling elements each have a cross sectional thickness of between 25% and 40% of the diameter of the roll axle.

13. The support roll according to claim 1, further comprising an inner ring arranged between the roll axle and the rolling elements to protect the roll axle from mechanical abrasion.

14. The support roll according to claim 13, wherein the inner ring has a maximum cross-sectional thickness of less than 20% of a radius of the roll axle.

15. The support roll according to claim 14, wherein the maximum cross-sectional thickness of the inner ring is less than 10% of the radius of the roll axle.

16. A roll arrangement for rolling mill systems or equipment for casting, conveying, or straightening of metal products, comprising:

a support roll according to claim 1; and means for supporting the support roll.

17. The roll arrangement according to claim 16, wherein the supporting means includes a bearing block.

18. The roll arrangement according to claim 16, wherein the roll axle is supported in stationary manner by the support means.

19. A straightening, casting, or rolling machine comprising at least one support roll according to claim 1.

20. A method for producing a support roll comprising a substantially cylindrical roll axle, a hollow cylindrical outer ring arranged concentrically to the roll axle, and a plurality of rolling elements arranged between the roll axle and the outer ring, wherein the roll axle, at least in certain sections, comprises a cavity arranged eccentrically to a center axis of the roll axle, the cavity being arranged substantially between the center axis and a point at which load is introduced into a circumference of the support roll wherein the cavity is configured as a bore that extends substantially parallel to the center axis of the roll axle wherein a center axis of the bore is located in a plane passing between the load introduction point and the center axis of the roll axle, the method comprising the steps of:

providing a roll axle;

introducing an eccentric bore into the roll axle so that the bore extends substantially parallel to the center axis of the roll axle wherein a center axis of the bore is located in a lane passing between the load introduction point and the center axis of the roll axle; and assembling the roll axle, rolling elements, and a hollow cylindrical outer ring to form the support roll, wherein the rolling elements form a rotatable bearing between the outer ring and the roll axle.

\* \* \* \* \*